United States Patent
Liang et al.

(10) Patent No.: US 6,683,435 B1
(45) Date of Patent: Jan. 27, 2004

(54) ELECTRICAL MACHINE DRIVE METHOD AND SYSTEM

(75) Inventors: Feng Liang, Canton, MI (US); Henry Heping Huang, Canton, MI (US); Michael W. Degner, Novi, MI (US)

(73) Assignee: Ford Motor Company, Dearborn, MI (US)

( * ) Notice: Subject to any disclaimer, the term of this patent is extended or adjusted under 35 U.S.C. 154(b) by 0 days.

(21) Appl. No.: 10/064,218

(22) Filed: Jun. 21, 2002

(51) Int. Cl.$^7$ ................................................. H02P 7/36
(52) U.S. Cl. ...................... 318/727; 318/254; 318/138; 318/439; 318/801; 318/563; 318/434
(58) Field of Search ............................... 318/254, 138, 318/439, 801, 563, 434, 727

(56) References Cited

U.S. PATENT DOCUMENTS

| | | | | |
|---|---|---|---|---|
| 4,926,104 A | * | 5/1990 | King et al. ............ | 318/599 |
| 5,111,123 A | | 5/1992 | Hach et al. ............ | 318/434 |
| 5,428,522 A | * | 6/1995 | Millner et al. .......... | 363/63 |
| 5,739,664 A | * | 4/1998 | Deng et al. ............ | 318/808 |
| 6,005,784 A | * | 12/1999 | Ikeshita ................ | 363/37 |
| 6,078,173 A | | 6/2000 | Kumar et al. .......... | 324/158.1 |
| 6,121,736 A | * | 9/2000 | Narazaki et al. ........ | 318/254 |
| 6,242,873 B1 | | 6/2001 | Drozdz et al. .......... | 318/139 |

OTHER PUBLICATIONS

Welchko, Brian A. et al., IPM Synchronous Machine Drive Response to a Single–Phase Open Circuit Fault, IEEE Applied Power Electronics Conference (APEC), Mar. 4–8, 2001, Paper No. 13A.1, pp. 1–7.

Welchko, Brian A., et al., IPM Synchronous Machine Drive Response to Symmetric and Asymmetric Short Circuit Faults, EPE 2001—Graz ($9^{th}$ European Conference on Power Electronics and Applications, Graz, Austria, Aug. 27–29, 200, pp. 1–10.

El–Antably et al., System Simulation of Fault Conditions in the Components of the Electric Drive System of an Electric Vehicle or an Industrial Drive, IECON 1993, vol. 2 Power Electronics, pp. 1146–1150.

Szentirmai, L. et al., Computerised Fault Diagnosis of Induction Motor Drives, Electrical machine and Drives, Sep. 11–13, 1995, Conference Publication No. 412, IEEE pp. 182–186.

Ye, Zhongming et al., Simulation of Electrical Faults of Three Phase Induction Motor Drive System, PESC Record—IEEE Annual Power Electronics Specialists Conference, 2001, vol. 1, pp. 75–80.

* cited by examiner

*Primary Examiner*—Rita Leykin
(74) *Attorney, Agent, or Firm*—R. J. Hill & Associates; Carlos Hanze

(57) ABSTRACT

An electrical machine drive system (100) includes a DC power source (102), an inverter (104) and a three-phase electrical machine (106). In response to a fault condition, power switches (122, 124) in the inverter are opened. Any short circuits are then determined by examining the phase currents of the three-phase electrical machine. If short circuits are found in the inverter, then the inverter is made balanced by shorting all upper braches (122, 126) or all lower branches (124, 128), depending on the location of the short circuit. Torque ripples are avoided by balancing the circuit during the fault mode, thereby providing comfort to a user of an electric or hybrid electric vehicle employing the electrical machine drive system.

20 Claims, 4 Drawing Sheets

ELECTRICAL MACHINE DRIVE METHOD AND SYSTEM

BACKGROUND OF INVENTION

1. Field of the Invention

The present invention relates generally to electrical machine drive controls, and specifically, to a method and system for mitigating fault modes in electrical machine drives for hybrid electric vehicles, electric vehicles and other systems.

2. Discussion of the Prior Art

The need to reduce fossil fuel consumption and emissions in automobiles and other vehicles predominately powered by internal combustion engines (ICEs) is well known. Vehicles powered by electric motors attempt to address these needs. Also, hybrid electric vehicles (HEV), which combine a smaller ICE with electric motors into one vehicle, attempt to address these needs.

Understanding electrical drive operation is critical in the design of electric vehicles and hybrid electric vehicles. In particular, where permanent magnet electric motors are employed, diagnosis and mitigation of fault modes are critical. This is due in part to the continuous existence of permanent magnet flux, which may produce pulsation torque, over voltage or over current conditions during certain fault modes.

An electrical machine drive system includes a DC power source, an inverter, and an electrical machine. The DC power source is coupled to, and provides power to, the inverter. The electrical machine is coupled to the inverter, and is driven by the inverter. The electrical machine typically includes a first phase, a second phase and a third phase. The inverter to drive this electric machine includes a first stage, a second stage, and a third stage. The first stage of the inverter is coupled to the first phase of the electrical machine; the second stage of the inverter is coupled to the second phase of the electrical machine; and the third stage of the inverter is coupled to the third phase of the electrical machine. Each stage of the inverter has an upper power switch and a lower power switch. An upper diode is coupled across the upper power switch and a lower diode is coupled across the lower power switch.

Certain faults in the phases or stages of the electrical machine or inverter may result in undesirable characteristics. The faults may include open power switches, open diodes, shorted power switches, or shorted diodes, which may degrade system performance. For example, asymmetric operation of the electrical machine drive system due to an open or short may cause torque ripples, which may result in an undesirable ride, in the case of an electric or hybrid electric vehicle.

Therefore, a need exists for a detection and mitigation strategy for certain fault modes in electrical machine drive systems.

SUMMARY OF INVENTION

Accordingly, an object of the present invention is to provide a method and system for mitigating effects of a fault in an electrical machine drive system of an electric or hybrid electric vehicle.

Other objects of the present invention will become more apparent to persons having ordinary skill in the art to which the present invention pertains from the following description taken in conjunction with the accompanying figures.

In accordance with one aspect of the invention, a method is provided for fault mitigation in an electrical machine drive system. The electrical machine drive system includes a three-phase electrical machine, and an inverter coupled to the three-phase electrical machine. The inverter includes a first stage, a second stage, and a third stage. The first stage is coupled to a first phase of the three-phase electrical machine; the second stage is coupled to a second phase of the three-phase electrical machine; and the third stage is coupled to a third phase of the three-phase electrical machine. Each of the first stage, the second stage and the third stage includes an upper branch and a lower branch. The upper branch includes an upper power switch with an upper diode coupled across the upper power switch and the lower branch includes a lower power switch with a lower diode coupled across the lower power switch. The fault mitigation method includes the steps of: (1) opening the upper power switch and the lower power switch of each of the first stage, the second stage and the third stage of the inverter; (2) determining whether a diode or a power switch in the inverter is shorted; and (3) if a diode or a power switch in one of the first stage, the second stage, and the third stage is shorted, then commanding some power switches to close such that each phase current of the first phase, the second phase and the third phase is balanced. Ensuring balance requires insuring all lower power switches in the inverter are closed, if a lower diode or lower power switch has shorted, or ensuring all upper power switches in the inverter are closed, if an upper diode or upper power switch is shorted.

A further aspect of the present invention includes a system for fault mitigation. In addition to the electrical drive machine system described above, the system includes a control circuit and current sensors. The control circuit controls the power switches and receives inputs from the current sensors reflecting the phase currents. The control circuit implements the method steps given above.

BRIEF DESCRIPTION OF DRAWINGS

The foregoing objects, advantages, and features, as well as other objects and advantages, will become apparent with reference to the description and figures below, in which like numerals represent like elements and in which.

DETAILED DESCRIPTION

Figure 1:
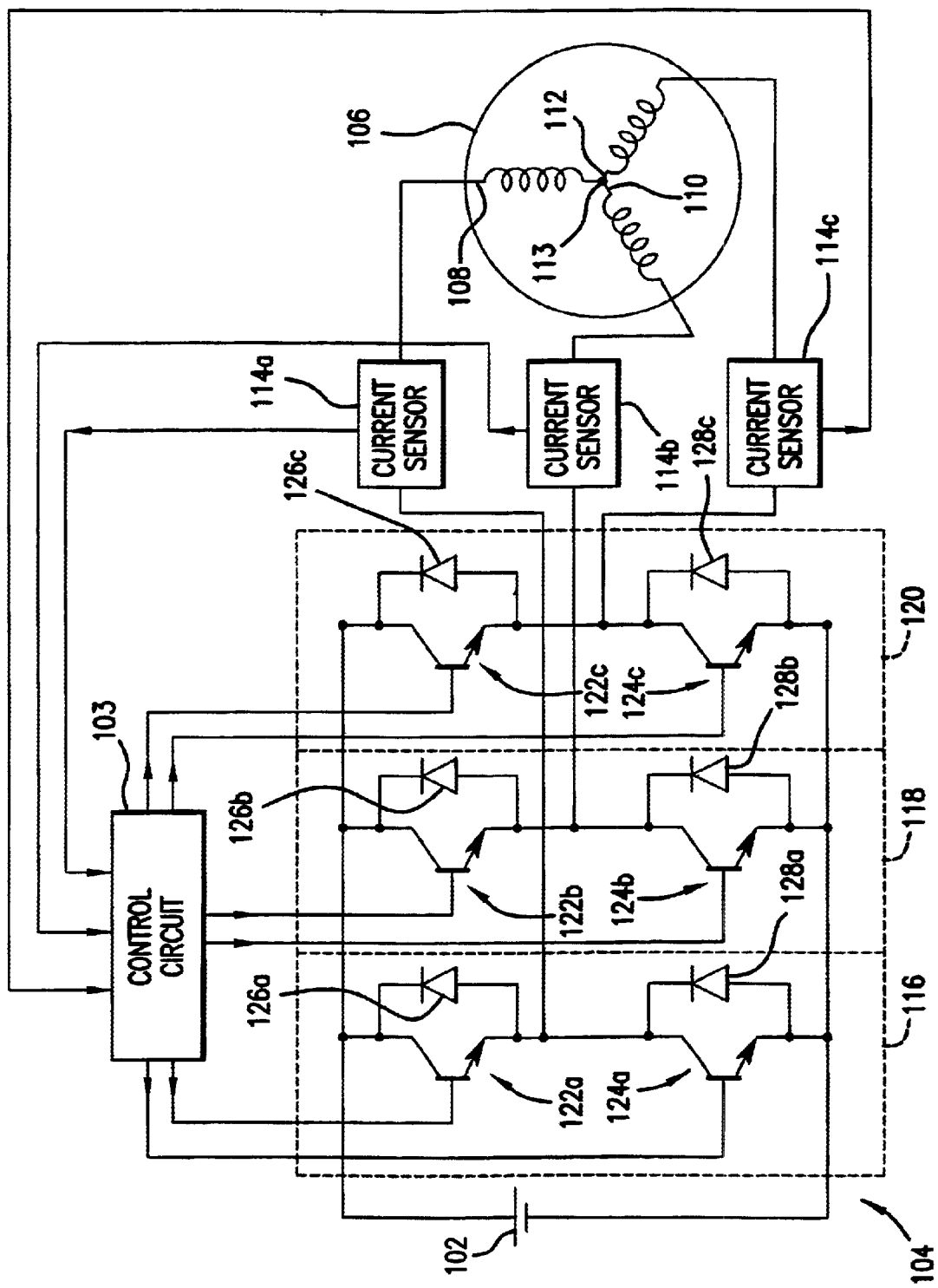
FIG. 1 is a schematic diagram illustrating an electrical machine drive system in accordance with a preferred embodiment of the present invention.

FIG. 1 is a schematic diagram showing an electrical machine drive system 100 in accordance with a preferred embodiment of the present invention. Electrical machine drive system 100 includes a DC (direct current) power source 102, a control circuit 103, an inverter 104, and an electrical machine 106. In a preferred embodiment, electrical machine drive system 100 is a drive component for a hybrid electric or electric vehicle. Most preferably, electrical machine drive system 100 is mechanically coupled through gears to drive the wheels of a hybrid electric or electric vehicle in any manner known in the art. As shown in FIG.

1, DC power source 102 is coupled to inverter 104 to provide a source of DC power to inverter 104. The inverter 104 is coupled to three-phase electrical machine 106 to drive electrical machine 106.

In the preferred embodiment, DC power source 102 includes a battery. In alternate embodiments the DC power source is a fuel cell or another electric machine, etc. Electrical machine 106 includes a first phase 108, a second phase 110, and a third phase 112. The three phases are coupled together at a node 113. As an alternative to coupling the three phases at a node, the phases may be coupled by a Delta connection or any other suitable connection.

In the preferred embodiment, inverter 104 includes three stages that drive the three phases of electrical machine 106. More specifically, first stage 116 drives first phase 108; second stage 118 drives second phase 110; and third stage 120 drives third phase 112. Current sensors 114a, 114b, and 114c are coupled to sense the currents in first phase 108, second phase 110, and third phase 112, respectively.

Each of the stages 116, 118, 120 of inverter 104 includes a pair of power switches arranged in a push-pull configuration. More specifically, each stage has an upper power switch 122 and a lower power switch 124. Upper power switch 122 has its emitter coupled to the collector of lower power switch 124. The power switches shown in FIG. 1 are bipolar transistors. However, the invention is not so limited, and the power switches may be any suitable power switches, including MOSFET, or other semiconductor power switches. The substitution of bipolar power switches with other switches is known to those of skill in the art.

The power switches in FIG. 1 are labeled with an alphabet in addition to the reference numeral to reflect whether the switch is associated with the first stage (a), second stage (b) or third stage (c). For example, upper power switch 122a is associated with the first stage and lower power switch 124b is associated with the second stage. When the power switches are referred to generally, that is, without specificity to a particular stage, the alphabet is not used. Such convention shall be followed throughout this specification, including with respect to other components.

Each upper power switch 122 has an upper diode 126 coupled across it to form an upper branch. More specifically, each upper diode 126 is coupled at one end to the emitter of an upper power switch 122 and at the other end to the collector of an upper power switch 122. Similarly, each lower power switch 124 has a lower diode 128 coupled across it to form a lower branch. More specifically, each lower diode 128 is coupled at one end to the emitter of a lower power switch 124 and at the other end to the collector of a lower power switch 124.

Control circuit 103 controls the upper power switches 122 and the lower power switches 124. More specifically, control circuit 103 drives the bases of upper power switches 122 and lower power switches 124 to turn the switches on and off. Control circuit 103 also receives the outputs of current sensors 114. Control circuit 103 preferably includes a microprocessor, micro-controller, digital signal processor or the like, for performing the functions specified herein. Alternatively, control circuit 103 is hardwired logic and other circuitry for performing the functions specified herein. As discussed further below, in accordance with the invention, fault conditions are sensed and control circuit 103 operates to mitigate the fault by configuring inverter 104.

Figure 2:
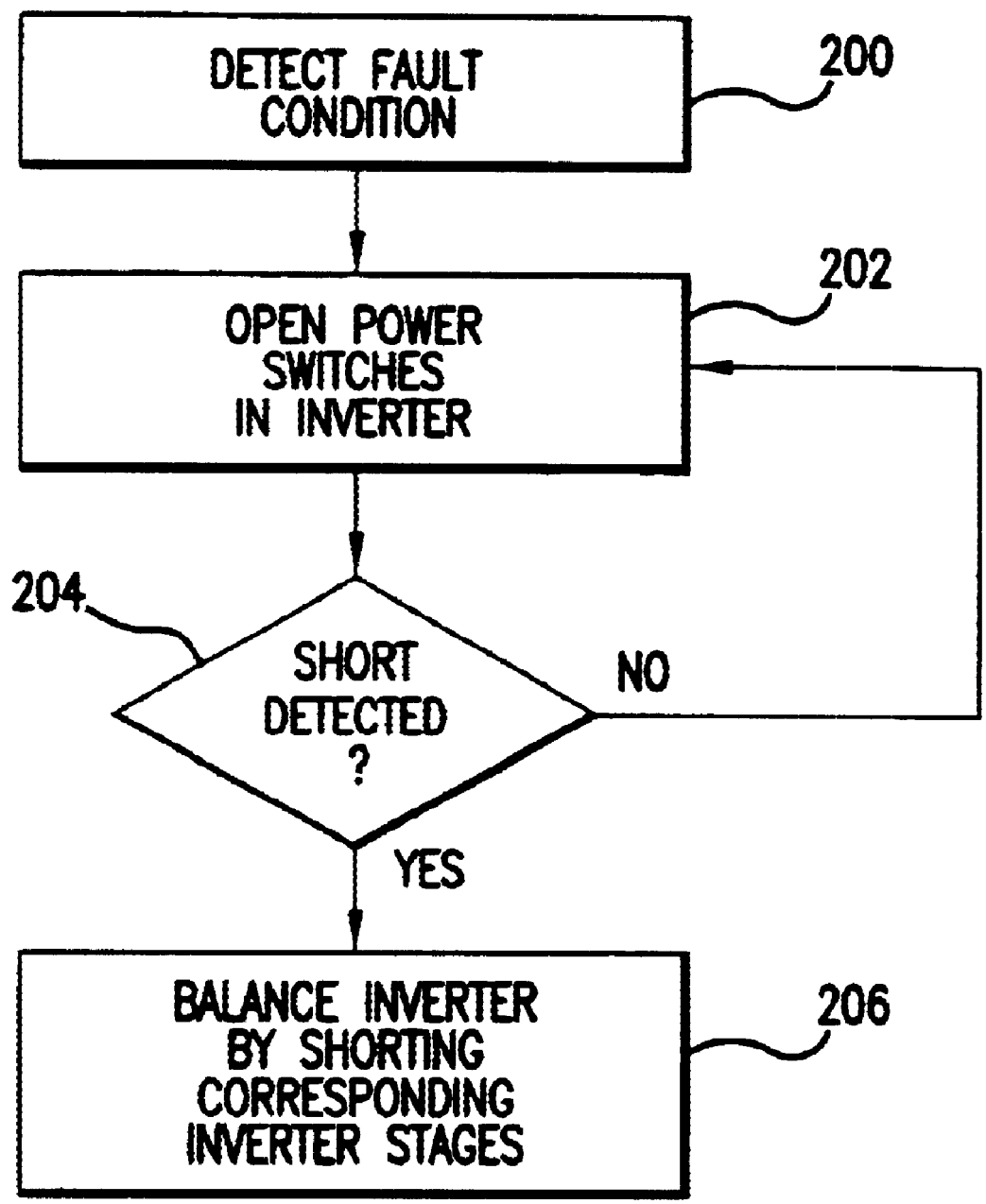
FIG. 2 is a flow diagram illustrating a method for fault mitigation in accordance with a preferred embodiment of the present invention.

FIG. 2 is a flow chart illustrating a method for fault mitigation in accordance with the present invention. Also, the operational aspects of the preferred embodiment are described below with respect to FIG. 2.

The fault mitigation strategy begins with the detection of a particular fault condition (200). According to the invention, the fault condition is typically a condition of over voltage or over current. The fault condition is directly sensed by current sensors 114 or through other sensing circuits in the system or associated with the vehicle.

In response to the fault condition, in particular an over voltage or over current condition, a first mitigation approach is to open, i.e., turn off, the upper power switches 122 and lower power switches 124 of inverter 104 (202). When the upper power switches 122 and lower power switches 124 are opened, the power switches approximate open circuits.

Unfortunately, opening the upper power switches 122 and lower power switches 124 alone, may not be sufficient to mitigate the fault condition. In particular, certain simulations and studies have shown that a short may persist in the inverter after all the power switches are open. Therefore, after the power switches are opened (202), a determination is made as to whether there are short-circuited switches or diodes in the inverter 104, that is, whether an upper branch or lower branch is shorted (204). In the preferred embodiment, this determination is generally made through the examination of the average phase currents of each phase of the electrical machine. Most preferably, control circuit 103 determines an approximate location of a short circuit through examination of the average phase currents provided to the control circuit 103 by current sensors 114. More specifically, if the average phase current for a particular phase is greater than zero, and the average phase currents of the other two phases are each less than or equal to zero, then the upper power switch 122 or upper diode 126 (upper branch) of that particular phase is likely shorted. For example, if the second phase 110 has an average phase current that is greater than zero and the first phase 108 and third phase 112 each have average phase currents that are less than or equal to zero, then the second phase likely has a shorted upper diode 126b. Or, the upper power switch 122b is actually shorted. On the other hand, if the average phase current for a particular phase is less than zero and the average phase currents of the other two phases are each greater than or equal to zero, then the lower diode 128 or lower power switch 124 (lower branch) of that particular phase is likely shorted. For example, if the third phase 112 has an average phase current that is less than zero and the first and second phase each have average phase currents that are greater than or equal to zero, then lower diode 128c is likely shorted. Or, lower power switch 124c is shorted.

In any event, if a short is found (204), then a mitigation strategy is implemented in accordance with the present invention (206). If no short is detected (204), then the strategy of opening all power switches is employed. The mitigation strategy employed according to the invention where a short is detected requires an attempt to balance the inverter in light of the location of the short. In particular, the inverter is balanced if all lower diodes or lower power switches (lower branches) of all stages are shorted or if all upper diodes or upper power switches (upper branches) of all stages are shorted. Therefore, if a determination is made that an upper diode or upper power switch (upper branch) is shorted in a particular stage, as discussed above, then the upper diodes are shorted in the remaining stages or in all stages. That is, if the first stage has an upper diode or upper power switch short, then the control circuit shorts the remaining stages or all stages by turning on the upper power switches of the remaining stages or all stages. Similarly, if a determination is made that a lower diode or lower power switch (lower branch) is shorted in a particular stage, as discussed above, then the lower switches of the remaining stages or all stages are shorted. For example, if the second stage has a lower diode short, the control circuit shorts, i.e., closes, the lower switches of the first and third stages or shorts the lower switches of the first, second and third stages.

Figure 3A:
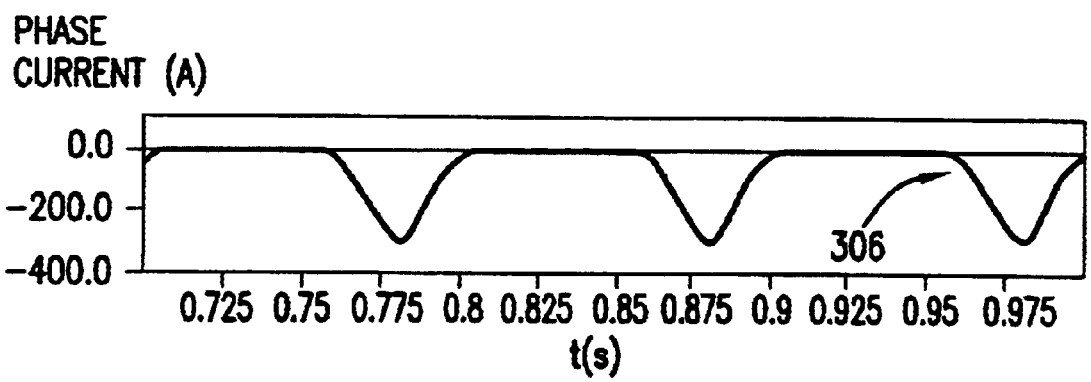
FIGS. 3A–C are curves illustrating phase currents for a certain fault mode.
Figure 3B:
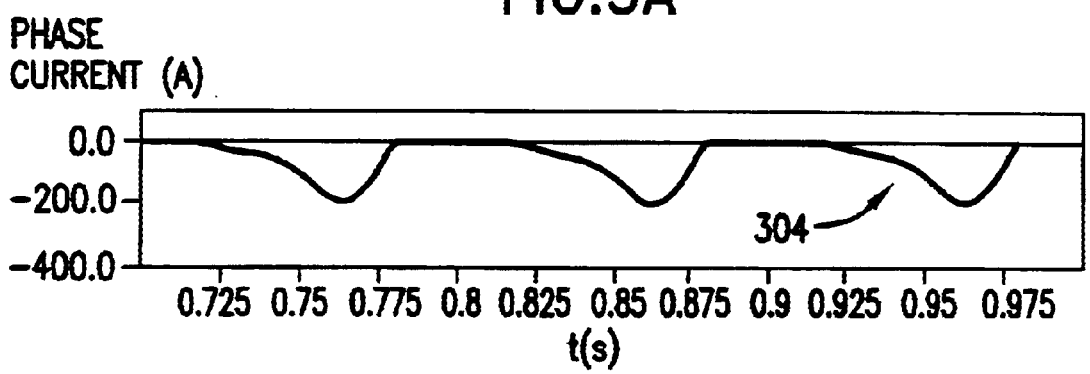
Figure 3C:
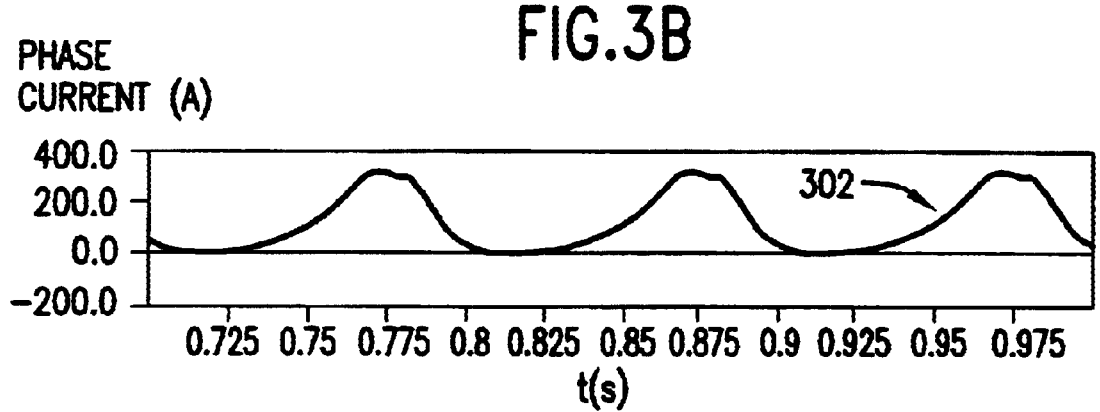

FIGS. 3A–C illustrate phase currents for a fault condition where all power switches are open and an upper diode or upper power switch (upper branch) is shorted. In particular, FIGS. 3A–C show that the curve of the first phase current 302 is on average greater than zero; and the curve of the second phase current 304 and the curve of the third phase current 306 are on average less than or equal to zero. This corresponds to a fault condition where all power switches are open and the upper branch of the third stage of the inverter is shorted.

Figure 4A:
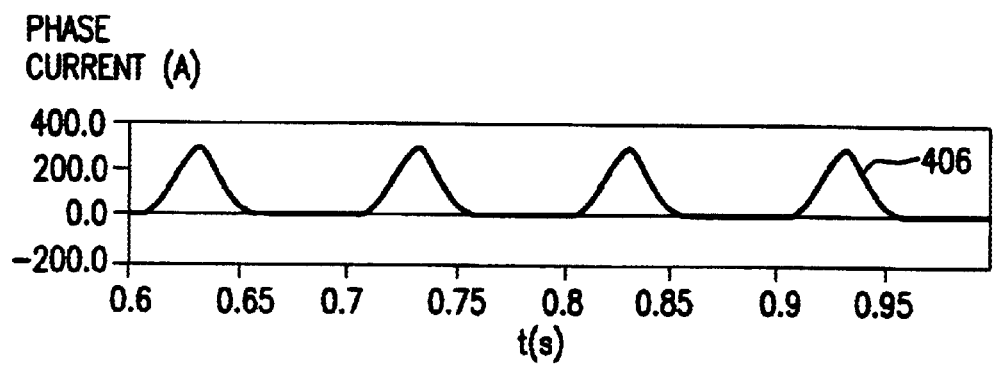
FIGS. 4A–C are curves illustrating phase currents for another fault mode.
Figure 4B:
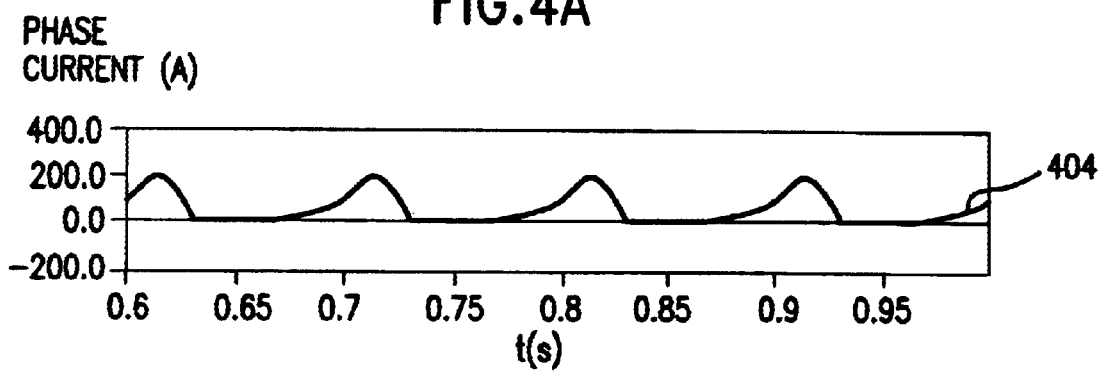
Figure 4C:
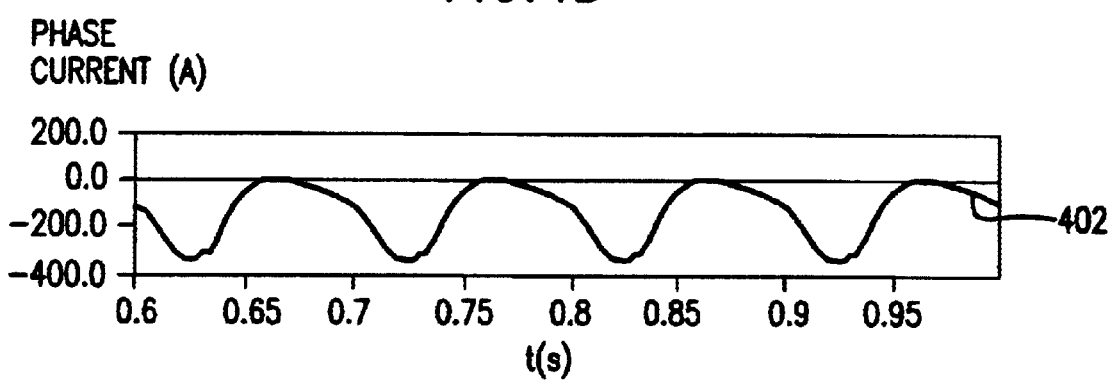

FIGS. 4A–C illustrate phase currents for a fault condition where all power switches are open and a lower diode or a lower power switch (lower branch) is shorted. In particular, FIGS. 4A–C show that the curve of first phase current 402 is on average less than zero; and the curve of the second phase current 404 and the curve of the third phase current 406 are on average greater than or equal to zero. This corresponds to a fault condition where all power switches are open and the lower branch of the third stage of the inverter is shorted.

As described above, a fault mitigation strategy includes detecting a fault condition and opening power switches in an inverter in response to the fault condition. Then the presence of a short is determined and the circuit is made balanced based on the location of the short. Advantageously, a fault condition is mitigated to provide more comfort to a user of a vehicle experiencing the fault.

The above-described embodiments of the invention are provided purely for purposes of example. Many other variations, modifications, and applications of the invention may be made.

What is claimed is:

1. A method of operating an electrical machine drive system that includes a three-phase electrical machine, and an inverter coupled to the three-phase electrical machine, the inverter including a first stage, a second stage, and a third stage, wherein the first stage is coupled to a first phase of the three-phase electrical machine, the second stage is coupled to a second phase of the three-phase electrical machine, and the third stage is coupled to a third phase of the three-phase electrical machine; and wherein each of the first stage, the second stage and the third stage includes an upper power switch and a lower power switch and the upper power switch has an upper diode coupled across the upper power switch and the lower power switch has a lower diode coupled across the lower power switch; the method comprising the steps of:

opening the upper power switch and the lower power switch of each of the first stage, the second stage and the third stage of the inverter; and determining whether a diode or a power switch in the inverter is shorted.

2. The method of claim 1 further comprising the step of:
if an upper diode or an upper power switch in one of the first stage, the second stage, and the third stage is shorted, then ensuring the upper diode or the upper power switch of each of the first stage, the second stage and the third stage is shorted.

3. The method of claim 1 further comprising the step of:
if a lower diode or a lower power switch in one of the first stage, the second stage, and the third stage is shorted, then ensuring the lower diode or the lower power switch of each of the first stage, the second stage, and the third stage is shorted.

4. The method of claim 1 wherein the step of determining whether a diode or a power switch in the inverter is shorted includes the step of determining a phase current for each of the first phase, the second phase, and the third phase of the three-phase electrical machine.

5. The method of claim 4 wherein the step of determining whether a diode or a power switch in the inverter is shorted includes the step of determining whether an average phase current for each of the first phase, the second phase, and the third phase of the three-phase electrical machine is equal to, greater than, or less than zero.

6. The method of claim 5 further comprising the step of determining that a lower diode or a lower power switch of one of the first stage, the second stage and the third stage is shorted by determining that two average phase currents for two of the first phase, the second phase, and the third phase of the three-phase electrical machine are greater than or equal to zero and another average phase current of the first phase, the second phase and the third phase of the three-phase electrical machine is less than zero.

7. The method of claim 5 further comprising the step of determining that an upper diode or an upper power switch of one of the first stage, the second stage and the third stage is shorted by determining that two average phase currents for two of the first phase, the second phase, and the third phase of the three-phase electrical machine are less than or equal to zero and another average phase current of the first phase, the second phase and the third phase of the three-phase electrical machine is greater than zero.

8. The method of claim 2 wherein the step of ensuring that an upper diode or an upper power switch of each of the first stage, the second stage and the third stage is shorted includes the step of turning on the upper power switch of each of the first stage, the second stage and the third stage.

9. The method of claim 3 wherein the step of ensuring a lower diode or a lower power switch of each of the first stage, the second stage and the third stage is shorted includes the step of turning on the lower power switch of each of the first stage, the second stage and the third stage.

10. An electrical machine drive system comprising:

a three-phase electrical machine;

an inverter coupled to the three-phase electrical machine, the inverter including a first stage, a second stage, and a third stage, wherein the first stage is coupled to a first phase of the three-phase electrical machine, the second stage is coupled to a second phase of the three-phase electrical machine, and the third stage is coupled to a third phase of the three-phase electrical machine;

and wherein each of the first stage, the second stage and the third stage includes an upper power switch and a lower power switch and the upper power switch has an upper diode coupled across the upper power switch to form an upper branch and the lower power switch has a lower diode coupled across the lower power switch to form a lower branch;

a first current sensor coupled to sense a phase current of the first phase of the three-phase electrical machine;

a second current sensor coupled to sense a phase current of the second phase of the three-phase electrical machine;

a third current sensor coupled to sense a phase current of the third phase of the three-phase electrical machine; and a control circuit coupled to control the first stage, the second stage, and the third stage of the inverter and coupled to the first current sensor, the second current sensor and the third current sensor, wherein the control circuit, in response to a fault condition:
  opens the upper power switch and the lower power switch of each of the first stage, the second stage and the third stage of the inverter; and
  determines whether a diode or a power switch in the inverter is shorted.

11. The system of claim 10 wherein if the upper branch in one of the first stage, the second stage, and the third stage is shorted, then the control circuit ensures the upper branch of each of the first stage, the second stage and the third stage is shorted.

12. The system of claim 10 wherein if the lower branch in one of the first stage, the second stage, and the third stage is shorted, then the control circuit ensures the lower branch of each of the first stage, the second stage, and the third stage is shorted.

13. The system of claim 10 wherein the fault condition is one of an over current condition and an over voltage condition.

14. The system of claim 10 wherein the control circuit determines whether a diode or a power switch is shorted based upon the phase current of the first phase, the phase current of the second phase and the phase current of the third phase.

15. The system of claim 12 wherein the control circuit determines that the lower branch of one of the first stage, the second stage and the third stage is shorted by determining that two average phase currents for two of the first phase, the second phase, and the third phase of the three-phase electrical machine are greater than or equal to zero and another average phase current of the first phase, the second phase and the third phase of the three-phase electrical machine is less than zero.

16. The system of claim 11 wherein the control circuit determines that the upper branch of one of the first stage, the second stage and the third stage is shorted by determining that two average phase currents for two of the first phase, the second phase, and the third phase of the three-phase electrical machine are less than or equal to zero and another average phase current of the first phase, the second phase and the third phase of the three-phase electrical machine is greater than zero.

17. The system of claim 10 wherein the control circuit comprises one of a microprocessor, a micro-controller, and a digital signal processor.

18. A method of operating an electrical machine drive system that includes a three-phase electrical machine, and an inverter coupled to the three-phase electrical machine, the inverter including a first stage, a second stage, and a third stage, wherein the first stage is coupled to a first phase of the three-phase electrical machine, the second stage is coupled to a second phase of the three-phase electrical machine, and the third stage is coupled to a third phase of the three-phase electrical machine; and wherein each of the first stage, the second stage and the third stage includes an upper power switch and a lower power switch and the upper power switch has an upper diode coupled across the upper power switch to form an upper branch and the lower power switch has a lower diode coupled across the lower power switch to form a lower branch; the method comprising the steps of:
  opening the upper power switch and the lower power switch of each of the first stage, the second stage and the third stage of the inverter in response to a fault condition;
  determining whether a diode or a power switch in the inverter is shorted; and if the upper branch or the lower branch in one of the first stage, the second stage, and the third stage is shorted, then ensuring some other branches are shorted such that each phase current of the first phase, the second phase and the third phase is balanced.

19. The method of claim 18 wherein the upper power switch and the lower power switch of each of the first phase, the second phase and the third phase are chosen from the group consisting of bipolar transistors, MOS transistors, and field-effect transistors.

20. The method of claim 18 wherein the step of determining whether a diode or a power switch in the inverter is shorted includes the step of determining whether an average phase current for each of the first phase, the second phase, and the third phase of the three-phase electrical machine is equal to, greater than, or less than zero.

* * * * *